Figure 1:
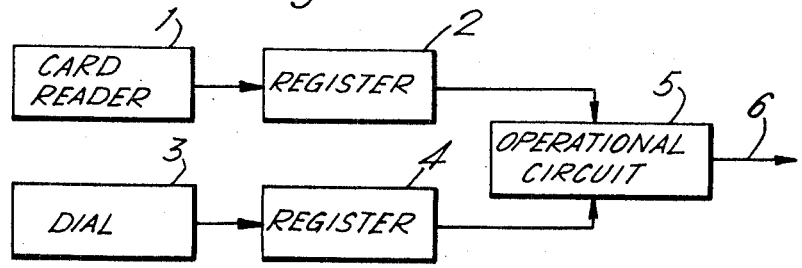

Yamamoto et al.

[15] 3,655,947
[45] Apr. 11, 1972

[54] IDENTIFICATION SYSTEM

[72] Inventors: Mititaka Yamamoto; Masanori Nagata, both of Kyoto, Japan

[73] Assignee: Omron Tateisi Electronics Co., Kyoto, Japan

[22] Filed: Sept. 10, 1969

[21] Appl. No.: 856,576

[30] Foreign Application Priority Data

Sept. 19, 1968 Japan.....................43/67902

[52] U.S. Cl.........................................235/61.7 B
[51] Int. Cl..............................................G06k 5/00
[58] Field of Search.....................235/61.7 B; 340/149 A

[56] References Cited

UNITED STATES PATENTS

| 3,221,304 | 11/1965 | Enikeieff et al. | 235/61.7 B |
| 3,262,124 | 7/1966 | Albiani | 235/61.7 B |
| 3,401,830 | 9/1968 | Mathews | 235/61.7 B |
| 3,443,069 | 5/1969 | Bjorn | 235/61.7 B |
| 3,453,598 | 7/1969 | Schweizer | 235/61.7 B |

*Primary Examiner*—Daryl W. Cook
*Attorney*—Christensen & Sanborn

[57] ABSTRACT

A system for identifying the proper user of a credit card or the like in a vending machine or the like. Each card used in the system is given two different code numbers, one of which is written on the card as the card number with the other being known to the proper owner of that card as its secret number. When a card is introduced into the system, the user of the card enters into the system its secret number by means of a dial or the like. There are provided in the system several types of operation, one of which is selected in accordance with the card number of the introduced card and the selected type of operation is conducted on the secret number. The result of the operation is compared with a predetermined number and when correspondence between the card number and the secret number is recognized on the basis of the result of the comparison, the user of the card is identified as the proper owner of that card.

5 Claims, 2 Drawing Figures

PATENTED APR 11 1972  3,655,947

HITITAKA YAMAMOTO
MASANORI NAGATA
INVENTORS

BY Christensen,
Sanborn & Matthews
ATTORNEYS

IDENTIFICATION SYSTEM

This invention relates to an identification system and more particularly to a system for identifying the proper user of a credit card or the like in a vending machine or the like.

Recent years have seen a trend toward credit purchasing using a personalized credit card. However, there are various problems in the use of credit cards. One of the problems is the use of a card by an illegal holder, that is, the person who is not entitled to use that card. To protect against such improper use of the card, it has been proposed to give each card two different code numbers, one being written on the card as the card number while the other is known to the proper owner of the card as its secret number, so that when a purchase is to be made, the purchaser inserts his or her card into the machine and at the same time enters the secret number into the machine by means of a dial or a pushbutton keyboard. The machine reads and memorizes the secret number as well as the card number and compares them to see if the proper correspondence exists between the two numbers. If the correspondence exists, the purchaser is identified as the proper owner of the card. Since the two card numbers must be different, it is necessary to scramble at least one of them. Heretofore, for example, the numerals 0, 1, 2, 3, ..., 9 have been scrambled as 7, 8, 9, 0, 1, 2, 3, ..., 6. In this case, if the card number is 123, its corresponding secret number is 890. The secret number 890 entered into the machine by the purchaser is therefore recognized as 123, which coincides with the card number 123. This method, however, has a serious defect. Even when the improper holder of a card initially does not know the secret number of the card, he may happen to know the card number of another card and its secret number from the proper holder of that other card, and from this information it would not be very difficult for the improper holder of the card to decipher the scrambled secret number of the card he or she illegally holds.

Accordingly, the primary object of the invention is to provide a system for identifying the proper user of a card in a vending machine or the like, wherein it is practically impossible to decipher from the card number its corresponding secret number.

Another object of the invention is to provide a system for identifying the proper user of a credit card or the like in a vending machine or the like, wherein either the card number or the secret number of a card includes a numeral which commands one of predetermined different types of operation, such as addition, subtraction, multiplication and division to be selected so that in response to this command, the selected type of operation is performed on the other of the two numbers, and the result of the operation is compared with a predetermined specific number or value to check the correspondence between the card number and the secret number, thereby identifying the proper user of the card.

Each card used in the system of the invention is given two code numbers, one of which is the card number written on the card while the other is the secret number known to the proper owner of the card. The system of the invention is provided with means for reading the card number of a card used in the system and means manually operated by the user of the card to enter its secret number into the system. The card number may be written on the card in the form of ordinary numerals of suitable code, and the card reader may be of an optical type. Alternatively, the card number may be written on the card magnetically or in a particular ink, and the card reader may be of the type that can sense the writing medium. The means operated manually by the user of a card to enter its secret number into the system may be of a dial or a pushbutton keyboard type. There are provided several types of operation and corresponding circuit means capable of performing the types of operation, respectively. One of the numerals constituting a portion of the card number or the secret number determines which of the different types of operation is to be performed.

Let it be assumed that the card number is 303 and the secret card number, 1812; and that the number in the first place of the three-digit card number, that is, 3 in the present case is the number that determines the type of operation to be performed. This latter number will be referred to hereinafter as the "operation-type-selection number." It is also assumed that when the operation-type-selection number is 0, 1, 2, or 3, one type of operation (let it be called "operation type I") is selected; that if the operation-type-selection number is 4, 5, or 6, another type of operation (let it be called "operation type II") is selected; and that if the operation-type-selection number is 7, 8, or 9, a third type of operation (let it be called "operation type III") is selected. The four-digit secret number, say, 1812 in the above example is divided into two two-digit numbers, that is, the number 18 consisting of the numerals in the fourth and the third places of the four-digit secret number and the number 12 consisting of the numerals in the second and first places of the secret number. For simplicity of description, the former number, that is, the number consisting of the numerals in the fourth and third places of the secret card number will be referred to as "Y" and the latter number, that is, the number consisting of the numerals in the second and first places of the secret number will be referred to as "Z".

The above-mentioned three different types of operation are selectively performed on the two numbers "Y" and "Z". Let it be assumed that operation type I is the summation of $Y + Z$; operation type II, the subtraction of $Y - Z$; and operation type III, the subtraction of $Z - Y$.

It is not always necessary to divide the secret number into two numbers, but is may be multiplied or divided by the operation-type-selection number, or summation or subtraction may be conducted in a different manner.

The result of the selected type of operation performed is then compared with a predetermined number or value, which may be arbitrarily selected, but most preferably it is the number consisting of the numerals remaining in the card number from which the operation-type-selection number has been removed, that is, the number consisting of the numerals in the 3rd and 2nd places of the card number. In the above-mentioned example, the card number is 303 from which the numeral in the first place, that is, the operation-type-selection number 3 is removed, so that the resulting number 30 will be used as the specific number with which the result of the selected type of operation is to be compared.

In the above-mentioned example, the secret card number is 1812. The operation-type-selection number is 3, which selects operation type I (the summation of $Y + Z$) to be performed on the two numbers 18 (=$Y$) and 12 (=$Z$) obtained from the secret number of 1812. The result of the summation is 30, which is identical with the specific number 30. Thus, when a purchaser introduces into the machine a card the identification number of which is 303 with its secret number being 1812 as its secret number, the purchaser is recognized as the proper owner of the card.

If the card number is 186, its secret number must be 4022. In this case, operation type II (the subtraction of $Y - Z$) is selected. If the card number is 159, its secret number must be 2035, and in this case operation III (the subtraction of $Z - Y$) is selected.

The system may also be arranged so that the operation-type-selection number is obtained from the secret number and so that the operation selected is performed on the card number.

Thus, in accordance with the invention, it is practically impossible for other persons that the proper owner of the card to decipher from the card number its corresponding secret number, so that the card can seldom be improperly used by any other person than the true and proper owner of the card.

Figure 2:
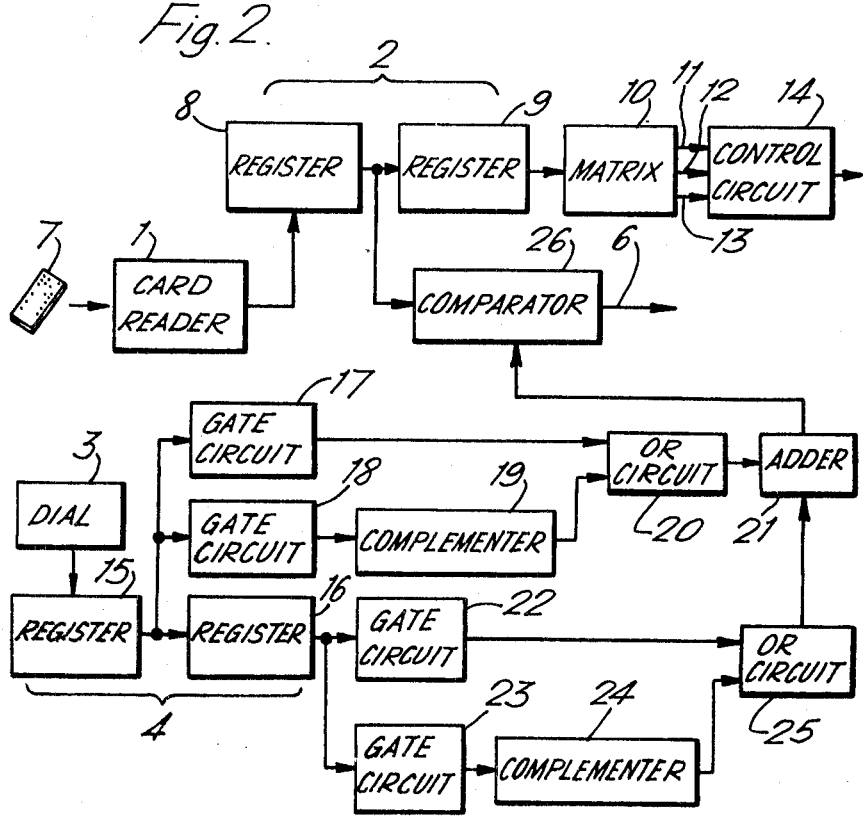

The invention will be better understood from the following description of a preferred embodiment thereof with reference to the accompanying drawings, wherein:

FIG. 1 is a block diagram showing the general layout of the system of the invention; and FIG. 2 is a block diagram showing in detail the system of FIG. 1.

Referring to FIG. 1, there is shown a card reader 1 which reads the identification number of a card inserted into a slot, not shown, provided for the purpose in, say, a vending machine. The card number that has been read is stored in a register 2. A secret card number previously known to the proper owner of the card is entered into the system by means of a dial 3 manipulated by the card holder who has inserted the card into the slot. The secret number is stored in a register 4. The numbers stored in the registers 2 and 4 are transferred into an operation circuit 5, where a selected type of operation is conducted. When a predetermined result is obtained from the type of operation conducted, the circuit 5 produces an output on a line 6. This output on the line 6 indicates that the card inserted into the system is being used by its proper owner and therefore may be used to actuate, say, a vending machine to deliver an article to the purchaser.

As previously mentioned in the introductory portion of the specification, various types of operation may be employed. In the illustrated embodiment, the previously mentioned three types of operation I, II and III are employed. FIG. 2 is a block diagram including the circuits for performing the three types of operation. The card reader 1 reads the card number of a card 7, which number is then stored in the register 2, as previously mentioned. The register 2 comprises two registers 8 and 9. Let the card number be 303, as previously assumed. The number 3 in the first place of the three-digit card number 303 is stored in the register 9 and the number 30 consisting of the numerals in the third and second places of the card number is stored in the register 8. It will be seen that the operation-type-selection number (which is 3 in the present case) is stored in the register 9. The number 3 stored in the register 9 is entered into a matrix 10, wherein it is converted into an output appearing on either of the three output lines 11, 12 and 13 of the matrix 10. Let the arrangement of the matrix 10 be such that when the operation-type-selection number is that which selects operation type I, an output appears on the line 11; that if the operation-type-selection number is that which selects operation type II, an output is produced on the line 12; and that if the operation-type-selection number is that which selects operation type III, an output is produced on the line 13.

Now the number stored in the register 9 is 3. Since the number is that which selects operation type I, an output is produced on the output 11 of the matrix 10. The outputs on the lines 11–13 are applied to a control circuit 14, which selects one of the three types of operation in accordance with the output condition on the lines 11–13 and controls the operation circuits to be described hereinafter to perform the selected type of operation.

The secret number that has been entered into the system by means of the dial 3 is stored in the register 4. The register 4 comprises a pair of registers 15 and 16. Let the secret number be 1812 as previously assumed. The registers 15 and 16 store the numbers 18 and 12, respectively.

The output from the register 15 is applied as an input to gate circuits 17 and 18. The output from the gate circuit 18 is applied as an input to a complementer 19. The output from the gate circuit 17 and the output from the complementer 19 are both applied as one input to an adder 21 through an OR circuit 20. On the other hand, the output from the register 16 is applied to a pair of gate circuits 22 and 23. The output from the gate circuit 23 is applied to another complementer 24. The output from the gate circuit 22 and that from the complementer 24 are both applied as a second input to the adder 21 through an OR circuit 25. Therefore, the adder 21 adds the outputs from the two or circuits 20 and 25.

As previously mentioned, the control circuit 14 controls the opening and closing of the gate circuits 17, 18, 22 and 23 in accordance with the selected type of operation. The circuit 14 also controls the shift timing of the registers 15 and 16. The manners in which such controls are conducted are so well known in the art that no further description thereabout will be required.

In the illustrated embodiment, when an output exists on the output line 11 of the matrix 10, the gate circuits 17 and 22 are opened. Let the card number and the secret number be 303 and 1812, respectively, as previously assumed. The output from the OR circuit 20 corresponds to the number 18 stored in the register 15 and the output from the OR circuit 25, to the number 12 stored in the register 16, so that the output from the adder 21 will become 30, that is, 18 + 12. This output from the adder 21 is compared with the output from the register 8 by a comparator 26. It is seen that the two outputs are identical, so that the comparator 26 produces an output on the line 6, which will be used to actuate, say, a vending machine to deliver an article to the purchaser, as previously mentioned.

Let the card number and the secret number be 186 and 4022, respectively. Since the number in the first place of the card number is 6, the matrix 10 produces an output on the line 12, as previously mentioned. The control circuit 14 opens the gate circuits 17 and 23. At this time the registers 8, 15 and 16 store the values 18, 40 and 22, respectively, as is easily understood from the previous description. The output value 22 from the register 16 is applied to the complementer 24 through the then open gate circuit 23. Since the complement of the number 22 is 78, the output value from the complementer is 78, which is entered into the adder 21 through the OR circuit 25. The adder 21 also receives the output value 40 from the OR circuit 20 and adds the two numbers 78 and 40. The adder 21 is so designed that the value in the third places of three-digit numbers resulting from the adding operation will overflow. Therefore, the output value from the adder 21 will be 18, so that the comparator 26 produces an output on the line 6. It is seen that the adder has now performed operation type II, that is, the subtraction of $Y - Z$.

Let the card number and the secret number be 159 and 2035, as previously assumed. The matrix 10 produces an output on the line 13. In response to the signal on the line 13, the control circuit 14 opens the gate circuits 18 and 22. The numbers stored in the registers 8, 15 and 16 are 15, 20 and 35, respectively. Therefore, the output from the complementer 19 corresponds to the complement of the number 20, that is, 80, so that the adder 21 adds the two numbers 80 and 35, the latter being the output from the register 16 applied through the OR circuit 25. The result of the addition is 15, since as previously mentioned the adder 21 is so designed that the number in the third place of three-digit numbers resulting from the adding operation will overflow. The comparator 26 compares the outputs from the adder 21 and the register 8 and, recognizing the coincidence therebetween, produces an output on the line 6. It will be easily seen that operation type III, that is, the subtraction of $Z - Y$ has now been performed.

In FIG. 2, the positions of the card reader 1 and the dial 3 may be interchanged so that on the basis of the secret number, for example, 303, a selected operation may be performed on the card number, for example, 1812.

In the above examples, addition or subtraction has been conducted on the two numbers $Y$ and $Z$. However, multiplication or division may also be employed. The result of the operation is compared with the number consisting of the numerals included in the card number in the above examples. The result of the operation may also be compared with any other number, and this number may be chosen from a group of predetermined numbers in accordance with the output condition on the lines 11–13.

What we claim is:

1. A system for identifying the proper user of a card in a vending machine or the like; said card having a first number recorded thereon, and a second secret number previously known to the proper owner of said card, comprising: means for reading said first card number; means manually operated by the user of said card to enter said second secret number into said system; means for performing a predetermined operation on one of said first and second card numbers in accordance with an operation-type-selection number contained in the other of said first or second numbers; and means for comparing the result of said operation and a predetermined number to produce an output signal when correspondence between said first and second numbers has been recognized on the basis of the result of said comparison.

2. The system of claim 1, wherein said operation performing means comprises a plurality of circuits for performing different types of operation and means operable in accordance with said operation-type-selection number to cause one of said plurality of circuits to perform one of said different types of operation on the other of said first and second numbers.

3. The system of claim 1, wherein said operation performing means comprises a plurality of circuits for performing different types of operation and means operable in accordance with said operation-type-selection number to cause one of said plurality of circuits to perform one of said different types of operation on two numbers obtained from the other of said first and second numbers.

4. The system of claim 1, further including means for obtaining said predetermined number from either said first number or said second number.

5. The system of claim 1, wherein said operation performing means comprises a plurality of circuits for performing different types of operation and means operable in accordance with said operation-type-selection number to cause one of said plurality of circuits to perform one of said different types of operation on the other of said first and second numbers, and wherein said comparing means compares the result of said operation with a number obtained from said one of said first and second numbers containing said operation-type-selection number.

* * * * *